United States Patent
Upatnieks

[15] 3,677,617
[45] July 18, 1972

[54] TECHNIQUES OF HOLOGRAPHIC DATA REDUCTION UTILIZING AN ADDITIONAL DIFFUSING STRUCTURE DURING RECONSTRUCTION

[72] Inventor: Juris Upatnieks, Ann Arbor, Mich.
[73] Assignee: Battelle Development Corporation, Columbus, Ohio
[22] Filed: May 27, 1971
[21] Appl. No.: 147,517

[52] U.S. Cl. .................................................350/3.5
[51] Int. Cl. ...............................................G02b 27/22
[58] Field of Search..................................350/3.5

[56] References Cited
UNITED STATES PATENTS
3,515,452   6/1970   Pole.......................................350/3.5

OTHER PUBLICATIONS

Leith et al., 56 J. Opt. Soc' Y Am. 523 (1966)
Haines, 7 Applied Optics 1185– 1189 (1968)

*Primary Examiner*—David Schonberg
*Assistant Examiner*—Robert L. Sherman
*Attorney*—Woodcock, Washburn, Kurtz and Mackiewicz

[57] ABSTRACT

An off-axis optical hologram is constructed of an object with an object modified light being passed through an array of small lenses or some other light modulator. Upon reconstruction of the hologram, a diffracted wavefront is passed back through the array of small lenses or other light modulator. Additionally, during reconstruction, a separate light diffusing element is placed in the path of the diffracted image-carrying beam prior to its striking the light modulator.

5 Claims, 2 Drawing Figures

TECHNIQUES OF HOLOGRAPHIC DATA REDUCTION UTILIZING AN ADDITIONAL DIFFUSING STRUCTURE DURING RECONSTRUCTION

BACKGROUND OF THE INVENTION

The present invention relates to the art of holography and more specifically to the art of reconstructing images from a data reduced optical hologram.

Fundamental principles of off-axis holography are now well known and are described by Leith and Upatnieks in The Scientific American, Vol. 212, No. 6, pp. 24—35, June, 1965, and in U.S. Pat. No. 3,506,327, issued Apr. 14, 1970. Briefly, optical off-axis holography involves the intersection at a photosensitive holographic detector of two mutually coherent light beams, one of which has been reflected from or transmitted through an object that is the subject of the hologram. Upon illumination of the hologram with a coherent light beam, an image of the object is reconstructed in full three dimensions.

There have been a number of recent developments that apply the fundamental principles of optical off-axis holography. A technique has been developed, for instance, for coding the object modified radiation wavefront prior to its striking the hologram by positioning in its path a modulating structure such as a light dispersive medium. Information of the object can be obtained from such a hologram only by passing a reconstructed image carrying diffracted light beam back through the same light dispersive medium in order to decode the wavefront. In this manner, the recorded information can be reconstructed from the hologram only with the knowledge of the dispersive medium used in its construction. This work is described more fully by Leith and Upatnieks in an article appearing in the Journal of the Optical Society of America, Vol. 56, page 523, 1966.

The use of a dispersive medium in the object modified beam prior to it striking the hologram may also have the effect of reducing the bandwidth of the information recorded on the hologram if the dispersive medium is positioned in a particular manner. Such techniques of data reduction holography are described in a paper by Haines et al appearing in Applied Optics, Vol. 7, pp. 1185—1189, (1968), and by Haines in copending application Ser. No. 809,171, filed Mar. 21, 1969, and issued February 1, 1972 as U.S. Patent No. 3,639,032.

The type of light dispersive medium utilized in the coding or bandwidth reduction techniques referred to above can be any one of a wide variety of dispersive media depending on the particular application. Such a dispersive structure is most generally a pure phase modulator; that is, object modified light radiation passing through or reflected from such a dispersive medium is affected only as to its relative phase thereacross rather than also including a modulation of its intensity. Such a phase modulator can be a random diffuser, such as ground glass, or it can have a periodically relative phase varying property thereacross. An example of a periodic phase varying structure is a plurality of small lenses formed into an array extending across a planar surface. A further specific example of a periodic phase varying dispersive medium is a fly's eye lens array.

A problem with such a use of a phase modulating structure is that there is some degree of degradation in a reconstructed image, depending on the specific type of phase modulator utilized. Therefore, it is primary object of the present invention to provide a technique of forming and reconstructing a hologram with the use of a dispersive medium in the object modified beam that results in a reconstructed image of improved quality.

SUMMARY OF THE INVENTION

It is believed that the reconstructed image degradation resulting from the use of a dispersive medium in the object modified beam during hologram construction results from the fact that dispersive media scatter some of the light of an object modified beam over angles so large that it is not captured by the hologram detector. This is especially the case in those applications where a significant bandwidth reduction is desired since the hologram aperture is generally made very small. When an array of lenses is utilized as the dispersive medium, for example, each individual lens may scatter light of a single point of the object into a cone of light which is only partially intercepted by the hologram detector. Therefore, when the hologram is reconstructed and a diffracted image-carrying beam is passed back through the array of lenses, only a portion of the light which passed through each lens during construction of the hologram is passed back through that same lens during reconstruction. Only a portion of each lens is utilized during reconstruction of the hologram, thus contributing to a spotty reconstructed image.

According to the present invention, this undesired image spottiness is substantially eliminated by the use of an additional diffusing structure during reconstruction of the hologram with coherent light. This diffusing structure is positioned between the hologram being reconstructed and the dispersive medium used to construct the hologram. More particularly, the additional diffusing structure is positioned coincident with a plurality of images of the object which are reconstructed directly from the hologram and represent those images formed individually by the lenses during construction of the hologram. The diffusing structure should have enough dispersive power to scatter light rays over a complete lens element of the array of lenses. In this manner, each of the lenses of the dispersive medium is fully utilized during reconstruction of the hologram, thus substantially eliminating spottiness in the image. Any image speckle introduced by use of the diffuser can be substantially eliminated by giving the diffuser motion while the image is viewed. Diffuser motion destroys the spatial coherence of the image carrying diffracted beam.

For a more detailed disclosure of the invention and for further objects and advantages thereof, reference should be made to the following description of a preferred embodiment of the invention.

DESCRIPTION OF THE PREFERRED EMBODIMENT

Figure 1:
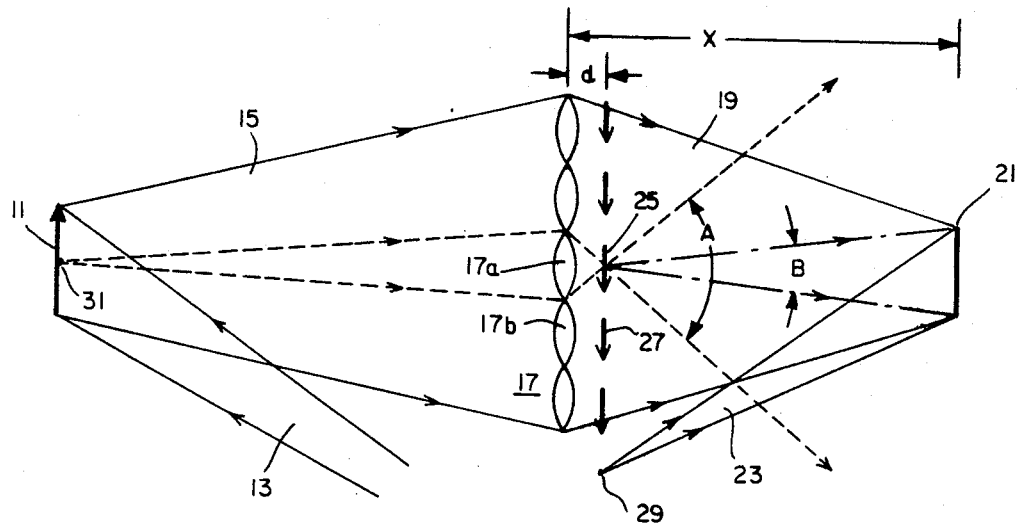
FIG. 1 illustrates construction of a hologram with the object modified beam passing through a dispersive medium.

Referring to FIG. 1, an optical arrangement for construction of a hologram through a dispersive medium is schematically illustrated. An object 11 is illuminated by a coherent light beam 13. The coherent light beam 13 is preferably obtained from a laser source (not shown). The coherent light beam 13 is reflected and modified by the object to form an object modified beam 15. A light modulating structure (dispersive medium) 17 is positioned in the path of the object modified beam 15. The dispersive medium 17 is shown to include a plurality of individual lenses 17a, 17b, etc., joined together in a planar surface. The dispersive medium 17 includes a two-dimensional array of such lenses but only a single line of this two-dimensional array is shown in FIG. 1 for simplicity. Additionally, only a few lenses are indicated in FIG. 1 where in a practical embodiment, a much larger number of lenses would be utilized across one direction of a two-dimensional lens array. The individual lenses may have characteristics of a fly's eye lens if desired.

The dispersive medium 17 is a pure phase modulator which forms a modulated object modified beam 19. A photosensitive holographic detector 21 is placed in the path of the modulated object modified beam 19 a distance "X" from the plane surface of the dispersive medium 17. A photosensitive holographic detector can be any one of a number of known materials used as detectors, such as silver halide photographic film emulsion or a photopolymer material. The holographic detector 21 is also illuminated with a coherent reference beam 23 that is mutually coherent with the object illuminating beam 13. The reference beam 23 is generally obtained from the same laser light source (not shown) as is the object illuminating beam 13, through the use of conventional optical elements including a beam splitter. The reference beam 23 strikes the detector 21 at a finite angle with the modulated object modified beam 19 to form an interference pattern thereon in the form of an off-axis hologram.

Each of the individual lenses of the modulating structure 17 forms a real space image of the object 11. For instance, the individual lens 17a forms an inverted image 25 in real space while the individual lens 17b forms an inverted image 27 of the object in real space. The images 25 and 27, as well as all the other individual images formed by the other individual lenses of the dispersive medium 17, are spatially separated from one another in a plane surface a distance $d$ behind the dispersive medium 17. This plane may be termed the "focal plane" of the lenses of the dispersive medium 17. The individual lenses 17a, 17b, etc. preferably have the same focal length. The reference beam 23 is controlled in its wavefront curvature, in a preferred embodiment, to appear to originate from a point source 29 that also lies substantially in the focal plane occupied by the individual real space images 25 and 27.

The operation of FIG. 1 and the reasons why an image reconstructed from the detector 21 is degraded may best be understood by tracing a few rays in FIG. 1. Consider a point 31 of the object 11 which scatters light from the object illuminating beam 13 over an angle that is at least large enough to strike the entire area of the individual lens 17a. These rays are brought to a focus to form a point of the object image 25 and then extend onward toward the hologram detector 21 with an angle "A" of dispersion between these rays. It can be seen that the detector 21 captures only that portion of these dispersed rays which lie within the angle "B". Therefore, a certain amount of information as to that object point is lost. When the detector 21 is utilized to reconstruct an image, only a portion of the individual lens element 17a is illuminated from the hologram detector 21. This results in an intensity pattern which appears as the background for the image of the object desired to be viewed.

Figure 2:
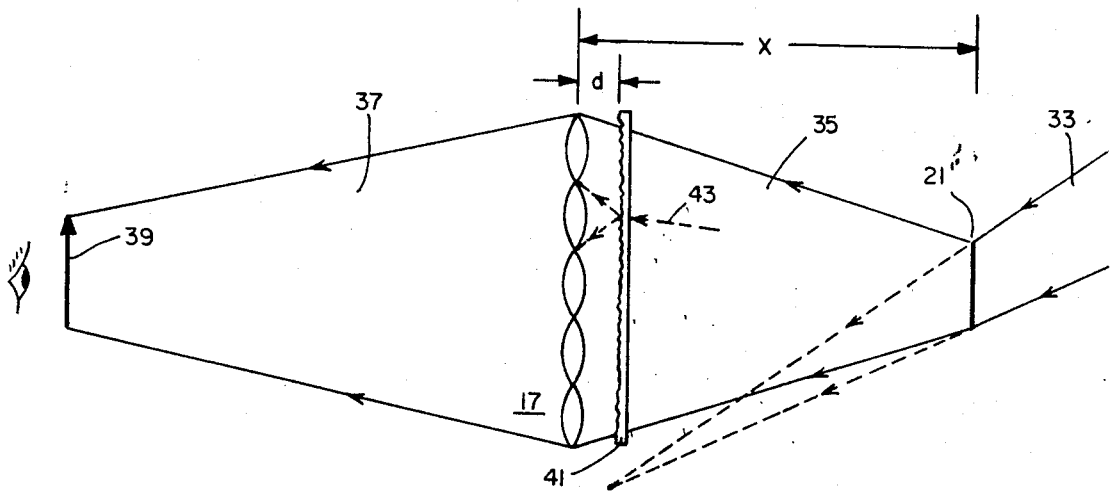
FIG. 2 shows reconstruction of a hologram constructed according to FIG. 1, including the improvement of the present invention.

After exposure of the hologram detector 21 to the interference pattern, the detector 21 is processed, if such processing is appropriate to the particular material utilized. The completed hologram 21' is reconstructed, according to the present invention in one form, as shown in FIG. 2. The hologram 21' is illuminated with a coherent reconstruction light beam 33 that is conjugate to the reference beam of FIG. 1. The coherent reconstructing beam 33 (FIG. 2) strikes the hologram 21' on its side opposite to that which was exposed during its construction according to FIG. 1. Additionally, the reconstructing light beam 33 has a wavefront curvature opposite to that of the reference beam 23 used in constructing the hologram 21'. Furthermore, the reconstructing light beam 33 is anti-parallel in direction to the reference beam 23. This particular hologram illuminating configuration that is preferred in carrying out the present invention results in a diffracted beam 35 that is a conjugate replica of the modulated object modified beam 19.

At a distance "X" from the hologram 21', an image of the dispersive medium 17 is formed in the reconstructed diffracted beam 35. At this image, the dispersive medium 17 is positioned in the beam 35. This eliminates the effect of the dispersive medium 17 in constructing the hologram and results in a light beam 37 in which an image 39 of the object 11 is formed and may be viewed. The light beam 37 is a replica of the object modified beam 15 of FIG. 1. The reconstructed image 39 of FIG. 2 is a pseudoscopic one.

Additionally reconstructed in real space in the diffracted beam 35 of FIG. 2 are images of the individual images 25, 27, etc. of FIG. 1. These holographically reconstructed images are positioned in a plane a distance $d$ from the dispersive medium 17 of FIG. 2. According to the present invention, a diffusing structure 41 is positioned coincident with these reconstructed images in the path of the diffracted light beam 35 and a distance $d$ in front of the dispersive medium 17, as shown in FIG. 2. The diffusing structure 41 may be, for instance, a ground glass or an optical flat piece that has been sandblasted on one side thereof.

The same modulating structure 17 has been shown to be used during both construction (FIG. 1) and reconstruction (FIG. 2) of the hologram 21'. It will be understood, of course, that the same physical modulating structure need not necessarily be employed in both the construction and reconstruction steps. The important factor is that the construction and reconstruction modulating structures have identical or substantially identical optical characteristics.

The dispersing power of the diffusing structure 41 is preferably sufficient to scatter a ray of light, such as the ray 43 shown in FIG. 2, over an angle that is large enough to at least cover one of the individual lens units of the dispersive medium 17. The dispersive power of the diffusing structure 41 may be greater than this, but it preferably is no smaller.

Improved results are obtained according to the present invention when the diffusing structure 41 remains stationery but the reconstructed image 39 is improved still further if the dispersive medium is moved while the image is being viewed. This movement can be a back-and-forth movement or a rotary movement so long as the dispersive medium 41 remains in a plane a distance $d$ in front of the dispersive medium 17 of FIG. 2. This movement destroys the spatial coherence of the diffracted beam 35 and thus eliminates any possibility that the diffusing structure 41 itself will introduce any speckle into a view of the image 39.

Prior to the present invention, the spottiness introduced by the use of an array of lenses as shown in FIG. 1 was minimized by decreasing the diameter of each of the individual lenses 17a, 17b, etc. This has the undesirable effect of reducing resolution capabilities of the holographic system. With the use of a diffusing structure 41, as explained with respect to FIG. 2, the diameter size of each of the individual lenses of the dispersive medium 17 may be made larger and thus provide an increased resolution capability of the optical system. A limitation on the size of each of the individual lenses is that it cannot be made so big that an abrupt change in parallax becomes apparent to a viewer as he moves.

The preferred embodiment of the present invention which has been described with respect to the Figures may be varied in many respects and still utilize the present invention. For instance, the dispersive media (modulating structures) utilized in both construction and reconstruction of the hologram need not be substantially identical, as described with respect to FIGS. 1 and 2, but may be phase conjugates of one another. The lens array in FIG. 1 may consist of negative lenses and that in FIG. 2 of positive lenses. Both arrays must have lenses of the same size (spacing), but need not have the same focal length. As before, the reconstructed images are formed near the focal plane of the lens array in FIG. 2 and a moving (or incoherent) diffuser is placed in the plane of these images. This particular variation will reconstruct a virtual image that will appear behind the scatter plate.

Another variation from the preferred embodiment involves moving the hologram closer to or further from the dispersive media during reconstruction than during construction. This will cause a change in the magnification and apparent location of the reconstructed image.

It will be understood that the invention is not limited to the various specific arrangements shown and that changes and modifications may be made within the scope of the appended claims.

What is claimed is:

1. A method of holographically reconstructing an image of an object, comprising the steps of:

illuminating the object with coherent light, thereby forming an object modified light beam, positioning a plurality of lenses across a surface of the object modified light beam, thereby forming a modulated object modified light beam in which an image of the object is formed by each of said plurality of lenses, recording said modulated object modified light beam and a reference beam as an off-axis hologram, illuminating said hologram with coherent light conjugate to the reference beam to reconstruct a conjugate replica of said modulated object modified light beam in which each of said images of the object formed by each of said plurality of lenses are reconstructed across a first surface in real space and in which an image of said plurality of lenses is reconstructed across a second surface in real space, said second surface being located a greater distance from said hologram than said first surface, positioning a plurality of lenses in the path of the reconstructed conjugate modulated object modified light beam replica at said second surface, said plurality of lenses in the path of the reconstructed beam having optical characteristics which forms a replica of said object modified beam in which an image of the object is reconstructed, and positioning a light diffusing element in said modulated object modified light beam replica coincident with said first surface, whereby a greater portion of each of said plurality of lenses in the reconstructed modulated object modified is utilized in forming an image of the object.

2. The method according to claim 1 wherein said diffusing element is moved during observation of said reconstructed object image in order to destroy the spatial coherence of said modulated object modified reconstructed radiation beam.

3. The method according to claim 1 wherein said plurality of lenses in the path of the reconstructed modulated object modified light beam replica have optical characteristics that are substantially identical with the optical characteristics of said plurality of lenses positioned across a surface of the object modified light beam during construction of the hologram.

4. The method according to claim 3 wherein the step of illuminating said hologram includes directing coherent light against the hologram in a manner to reconstruct said replica of the modulated object modified light beam with a conjugate wavefront.

5. The method according to claim 4 wherein said diffusing element is moved during observation of said reconstructed object image in order to destroy the spatial coherence of said modulated object modified reconstructed radiation beam.

* * * * *